United States Patent
Jöckel

(10) Patent No.: US 7,816,824 B2
(45) Date of Patent: Oct. 19, 2010

(54) ELECTRIC MOTOR WITH PERMANENT MAGNET EXCITATION AND ROTOR COOLING

(75) Inventor: Andreas Jöckel, Nuremberg (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 11/917,822

(22) PCT Filed: Jun. 8, 2006

(86) PCT No.: PCT/EP2006/062989

§ 371 (c)(1),
(2), (4) Date: Jul. 10, 2008

(87) PCT Pub. No.: WO2006/134057

PCT Pub. Date: Dec. 21, 2006

(65) Prior Publication Data

US 2008/0309174 A1 Dec. 18, 2008

(30) Foreign Application Priority Data

Jun. 16, 2005 (DE) .................. 10 2005 027 953

(51) Int. Cl.
H02K 9/19 (2006.01)
(52) U.S. Cl. .................. 310/57; 310/52; 310/54
(58) Field of Classification Search .............. 310/54, 310/52, 57
See application file for complete search history.

(56) References Cited

U.S. PATENT DOCUMENTS

| | | | | |
|---|---|---|---|---|
| 1,094,389 A | * | 4/1914 | Howe | 310/88 |
| 2,862,121 A | * | 11/1958 | Ringland | 310/57 |
| 4,204,134 A | * | 5/1980 | Fritz et al. | 310/52 |
| 4,574,210 A | | 3/1986 | Wieland | |
| 5,523,635 A | * | 6/1996 | Ferreira et al. | 310/71 |
| 6,100,615 A | * | 8/2000 | Birkestrand | 310/75 C |
| 6,707,180 B2 | * | 3/2004 | Hattori et al. | 310/61 |
| 7,061,147 B2 | * | 6/2006 | Ries | 310/54 |
| 2004/0011578 A1 | * | 1/2004 | Hoffmann et al. | 180/218 |
| 2004/0245865 A1 | * | 12/2004 | Ries | 310/52 |

FOREIGN PATENT DOCUMENTS

DE 20 20 953 11/1971

(Continued)

OTHER PUBLICATIONS

Markert, W.: "Einsatz von Wärmerohren zur Kühlung elektrischer Maschinen" in: Elektrie 36, vol. 1, 1982, pp. 30-32.

*Primary Examiner*—Quyen Leung
*Assistant Examiner*—Terrance Kenerly
(74) *Attorney, Agent, or Firm*—Henry M. Feiereisen; Ursula B. Day

(57) ABSTRACT

The invention relates to an electric motor (1) with permanent magnet excitation, comprising a stator (2), a rotor (8), comprising a hollow shaft (13) on which the permanent magnets (9) are positioned. The hollow shaft (13) is sealed tight against an output shaft (7) at least at the end faces thereof and a suitable coolant is provided in the enclosed cavity (14) which, during operation of the electric motor, evaporates from the relatively hot hollow shaft in the region of the permanent magnets (9) and condenses in the region of the relatively cold output shaft (7) such as to introduce a radial and axial heat transport.

9 Claims, 5 Drawing Sheets

FOREIGN PATENT DOCUMENTS

| | | |
|---|---|---|
| DE | 2 251 841 | 5/1974 |
| DE | 42 30 379 A1 | 3/1994 |
| DE | 100 19 914 A1 | 2/2001 |
| DE | 101 07 760 A1 | 9/2001 |
| DE | 103 01 079 A1 | 7/2004 |
| DE | 103 04 276 A1 | 8/2004 |
| DE | 103 22 022 A1 | 12/2004 |
| FR | 0306346 * | 5/2003 |
| GB | 1 283 332 | 7/1972 |
| JP | 57170042 A | 10/1982 |
| JP | 406217496 A * | 5/1993 |

* cited by examiner

ELECTRIC MOTOR WITH PERMANENT MAGNET EXCITATION AND ROTOR COOLING

BACKGROUND OF THE INVENTION

The invention relates to an electric motor having a stator and a rotor which has permanent magnets positioned on a hollow shaft.

In the case of electric motors with permanent magnet excitation, losses mainly occur in the stator. The comparatively lower heat losses of the rotor must nevertheless be dissipated. The problem of rotor heating is particularly serious in the case of electric motors which have a comparatively very long axial length and in which the distances from the center of the rotor to the outside of the end faces of the rotor are comparatively long.

The heat in the rotor reduces the magnetic flux, which results, inter alia, in impairment of the efficiency of the electric motor.

It is known practice to dissipate the losses of the rotor toward the stator via the supporting hollow shaft or via the air gap or to control them by means of an appropriate correspondingly cost-intensive choice of the magnetic material in order to thus reduce the reduction in flux.

Another possible way of dissipating the heat from the rotor is achieved by means of complicated separate ventilation in the rotor.

Another cost-intensive possible way of dissipating the heat from the rotor is to create an axial flow of heat to heat sinks via heat pipes situated in the rotor.

SUMMARY OF THE INVENTION

On the basis of this, the invention is based on the object of providing an electric motor with permanent magnet excitation which also provides efficient cooling of the rotor, the cooling of the rotor requiring comparatively little design complexity.

The object set is achieved by means of an electric motor with permanent magnet excitation having a stator and a rotor which has a hollow shaft on which permanent magnets are positioned, the hollow shaft being closed off in a pressure-tight manner with respect to an output drive shaft at least on its end faces, and a suitable cooling medium being situated in the enclosed cavity, said cooling medium evaporating on the comparatively hot hollow shaft in the region of the permanent magnets and condensing in the region of the comparatively colder output drive shaft during operation of this electric motor, with the result that radial heat transport is established.

In addition, axial heat transport through the cooling medium is established on account of the axial temperature gradient in the output drive shaft.

In this case, the heat loss of the rotor is now effectively transferred from the rotor to the inner continuous shafts of the electric motors, for example wheelset shafts or ship propulsion shafts. The rotor has a laminated core on which permanent magnets are situated in a tangential arrangement or in a flux concentration arrangement. These permanent magnets are advantageously fixed to the rotor by means of a binding, in particular made of glass fibers. Alternatively, the permanent magnets may also be situated in axially parallel recesses of the laminated core. The laminated core is shrunk onto a hollow shaft which allows sufficient heat transport in the radial direction. The decisive factor is that the hollow shaft is closed in a pressure-tight manner on the end face and with respect to the output drive shaft.

The cavity between the hollow shaft and the output drive shaft which is normally filled with air is filled with a cooling medium, preferably ethyl alcohol, which boils at approximately 60° C.-80° C. and then evaporates on the hot hollow shaft and condenses again on the correspondingly cooler output drive shaft. As a result, the heat is transferred in a very effective manner from the outside to the inside, that is to say radially to the output drive shaft. In the output drive shaft, said heat can then be easily discharged to the outside, for example to large driven wheels, drive wheels, propellers. This provides extremely efficient heat transport with comparatively little design complexity for an electric motor with permanent magnet excitation.

The solution according to the invention also has the following advantages:

The rotor of the electric motor with permanent magnet excitation remains considerably cooler than comparable rotors; as a result, a higher magnetic flux and thus comparatively improved efficiency of this electric motor are established.

Furthermore, the demagnetizing resistance of the permanent magnets is higher. Homogeneous heating of the hollow shaft and the wheelset shaft is established in the case of output drive shafts, for example wheelset shafts and their drive wheels in electrical locomotive vehicles.

Existing oxygen and residual moisture in the intermediate space between the hollow shaft and the output drive shaft can be combined by the cooling medium so that any possible frictional corrosion in the two shrinkage structures is greatly reduced.

The cooling medium is introduced into the cavity by providing a hole on one end face of the hollow shaft, for example, through which hole the cooling medium can be introduced. This filling operation is advantageously carried out after the hollow shaft has been mounted on the output drive shaft. This hole is then closed in a pressure-tight manner, for example using a screw plug, and is sealed.

Apart from in the event of damage, the connection between the hollow shaft and the output drive shaft is normally not released during operation of this electric motor, with the result that the medium never has to be removed again from this cavity.

The invention and further advantageous refinements of the invention according to features of the subclaims are explained in more detail below using diagrammatically illustrated exemplary embodiments in the drawing, in which:

DETAILED DESCRIPTION OF PREFERRED EMBODIMENTS

Figure 1:
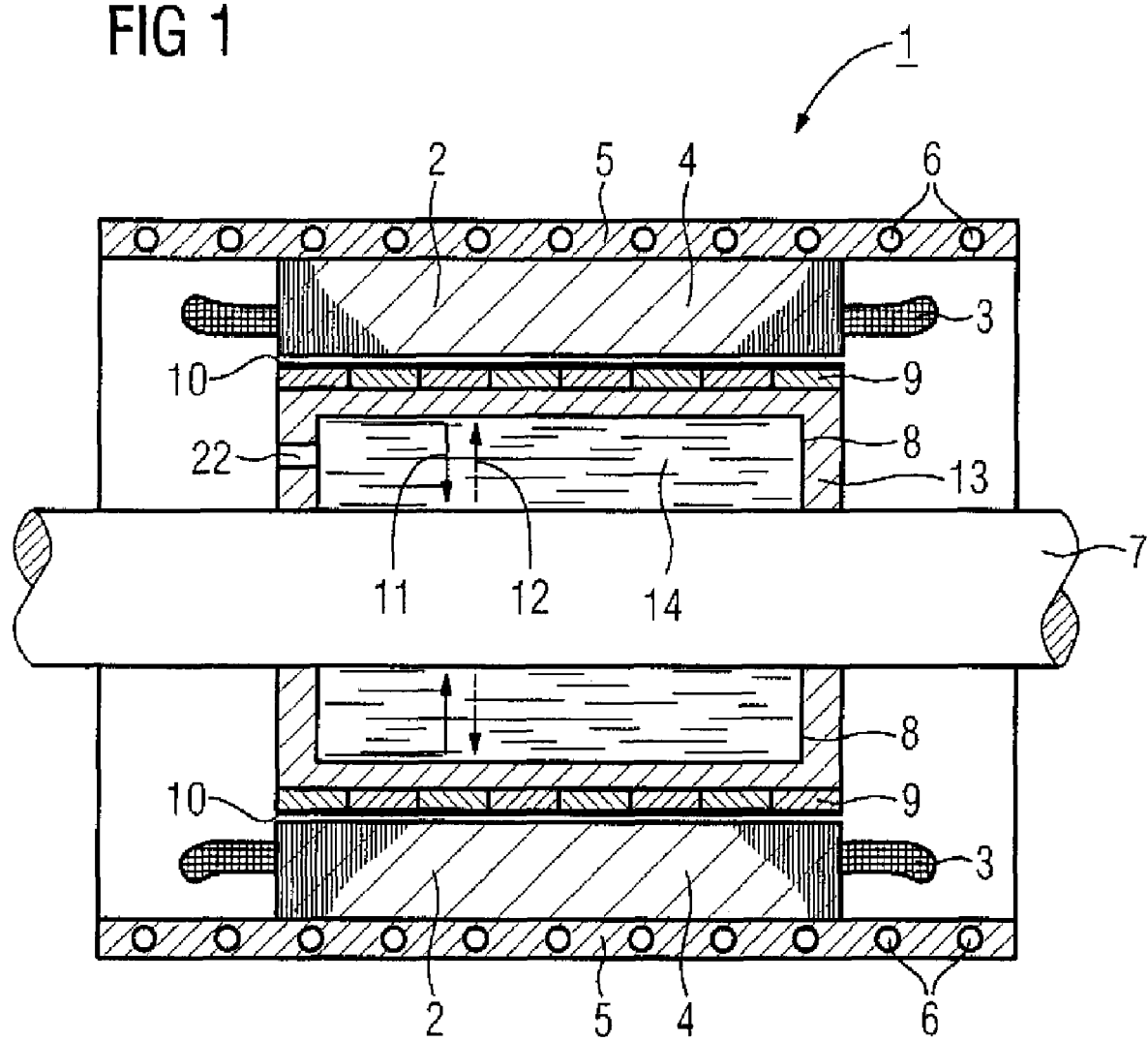
FIGS. 1, 2 show longitudinal sections through electric motors.

FIG. 1 shows a longitudinal section through a direct drive which is designed as a synchronous machine 1 with permanent magnet excitation. This diagrammatically illustrated synchronous machine 1 with permanent magnet excitation has a stator 2 which is constructed from layered laminates 4. Windings which form winding overhangs 3 on the end faces of the stator 2 are situated in the slots (not illustrated in any more detail) of the stator 2. The heat produced by the windings in the packed laminate 4 during operation of the electrical synchronous machine 1 is largely dissipated through a cooling medium, such as air or a liquid, situated in the cooling channels 6 (illustrated by way of example) using a cooling jacket 5. In this case, the cooling channels 6 are guided around the stator 2 in meandering or helical fashion.

The rotor 8 has a hollow shaft 13 which is shrunk onto an output drive shaft 7. The rotor 8 has, for the air gap of the synchronous machine 1 with permanent magnet excitation, permanent magnets 9 which are held in the circumferential direction using a binding 10. The invention is not only restricted to surface magnets but may also be applied to internal permanent magnets which are situated in pockets of the hollow shaft 13 which run in an essentially axial direction.

During operation of the synchronous machine 1 with permanent magnet excitation, losses now occur, inter alia, in the rotor 8 and must be dissipated in order to obtain the highest possible level of efficiency of the electrical synchronous machine 1. A cooling medium now transports the heat from the side of the permanent magnets 9 to the output drive shaft 7 through the cavity 14 of the hollow shaft 13. The cooling medium condenses on the output drive shaft and is transported back to the side of the permanent magnets 9. This essentially radial thermal circuit is indicated using arrows 11 and 12. The condensate can be transported back using centrifugal force or else, and this is particularly advantageous for slowly rotating machines, using gravitational force ("trickle down").

The output drive shaft 7 now passes the heat, on account of their good thermal conductivity, to wheels, propellers etc. (not illustrated in any more detail) which are connected to the output drive shaft 7 in a mechanically rigid and thermally conductive manner, where the heat is finally discharged to the surroundings over a large area. It goes without saying that a comparatively smaller amount of heat is also discharged to the surroundings from the output drive shaft 7 itself.

Figure 2:
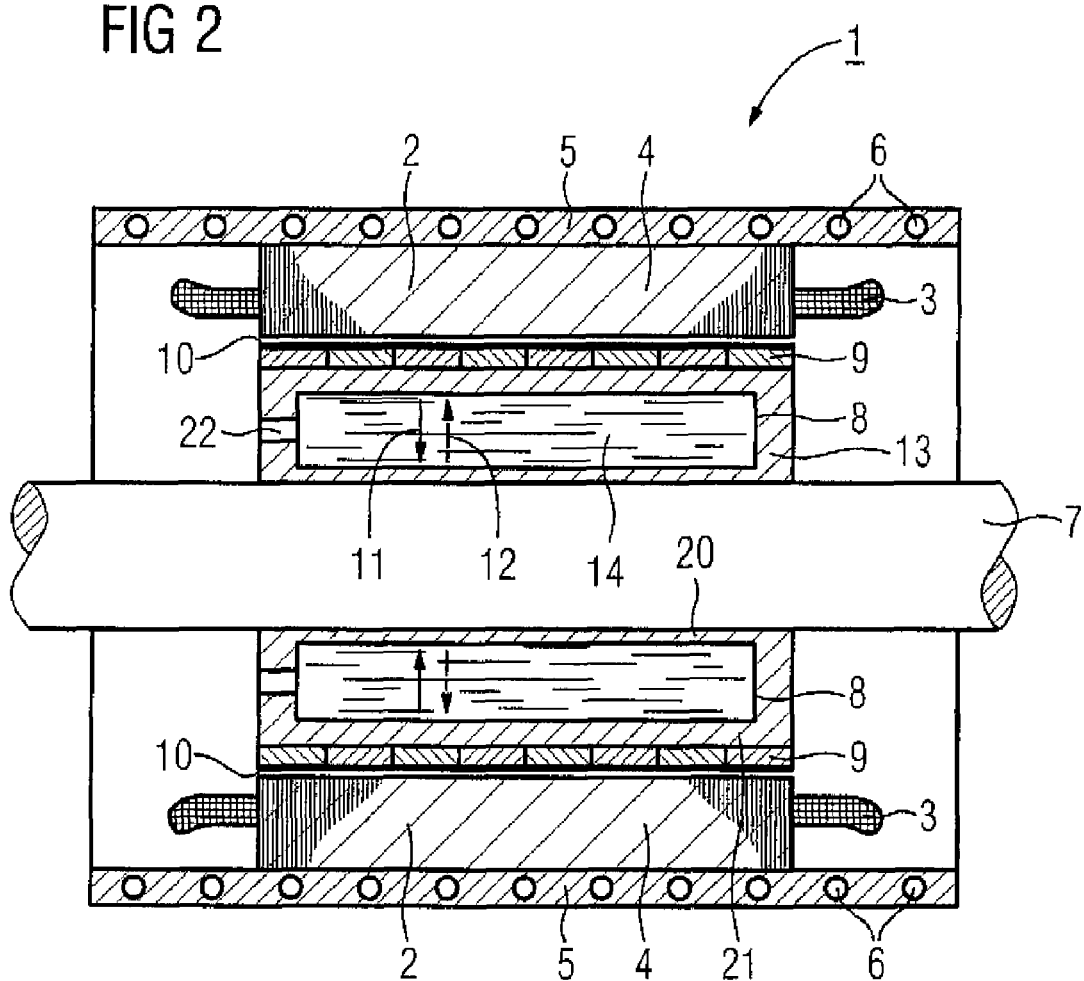

FIG. 2 shows a modification of the embodiment according to FIG. 1. In this case, the hollow shaft 13 is in the form of a double-walled cylinder whose inner cylinder 20 is shrunk onto the output drive shaft 7 and whose outer cylinder 21 is connected to the laminated core of the rotor 8 or is directly connected to the permanent magnets 9.

After the hollow shaft 13 has been mounted on the output drive shaft 7, the cooling medium is introduced into the cavity 14 via a hole 22 and the cavity is then closed in a pressure-tight manner.

Figure 3:
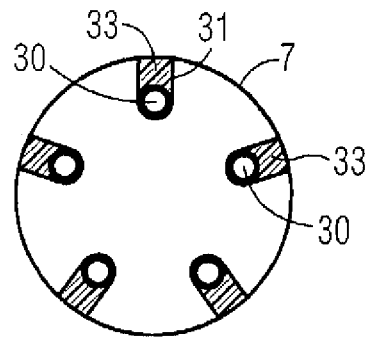
FIGS. 3 to 6 show cross sections of the electric motors in the region of the output drive shaft.
Figure 4:
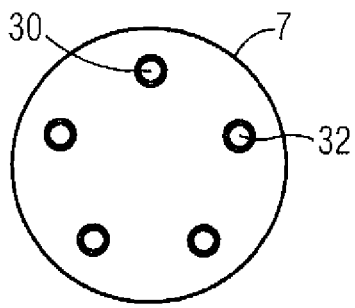

FIGS. 3 and 4 show an additional possible way of improving the thermal conductivity of the output drive shaft 7 in a cross section through the output drive shaft 7 of the embodiment according to FIG. 1. In this case, heat pipes 30 which are thermally coupled to the cooling medium and/or the output drive shaft by means of thermally conductive materials 33, if appropriate, are inserted into axially parallel recesses 31 or axially running holes 32. The holes 32 may also be centrically arranged in the output drive shaft 7.

The condenser zone of the heat pipes 30 is outside the motor space.

Figure 5:
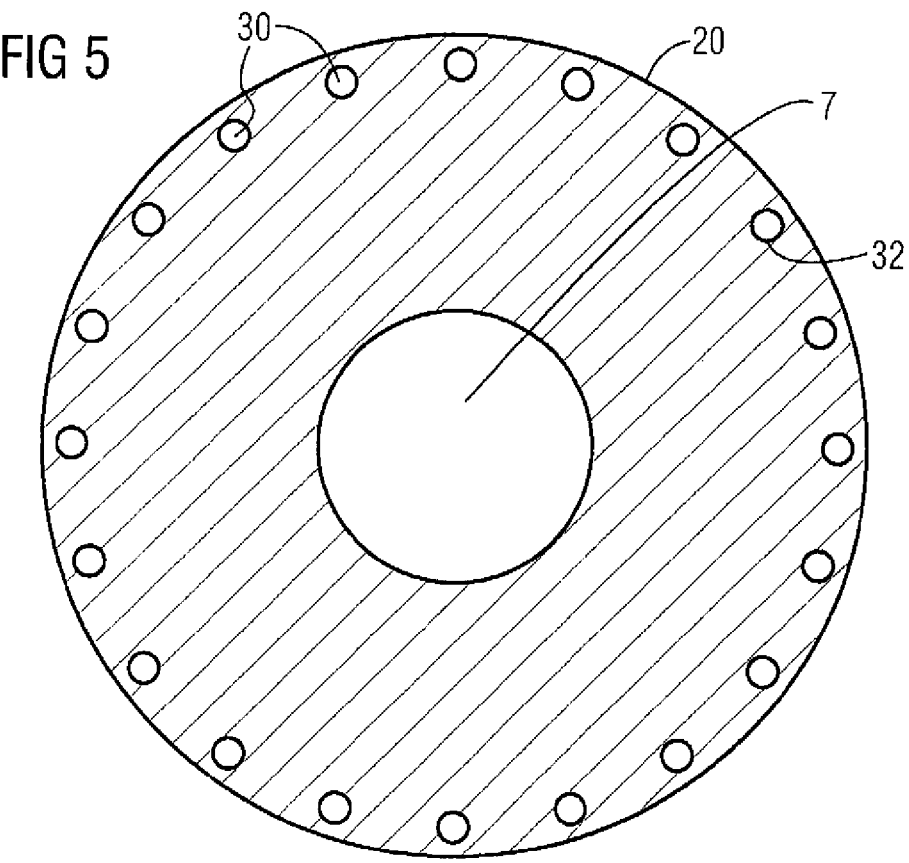
Figure 6:
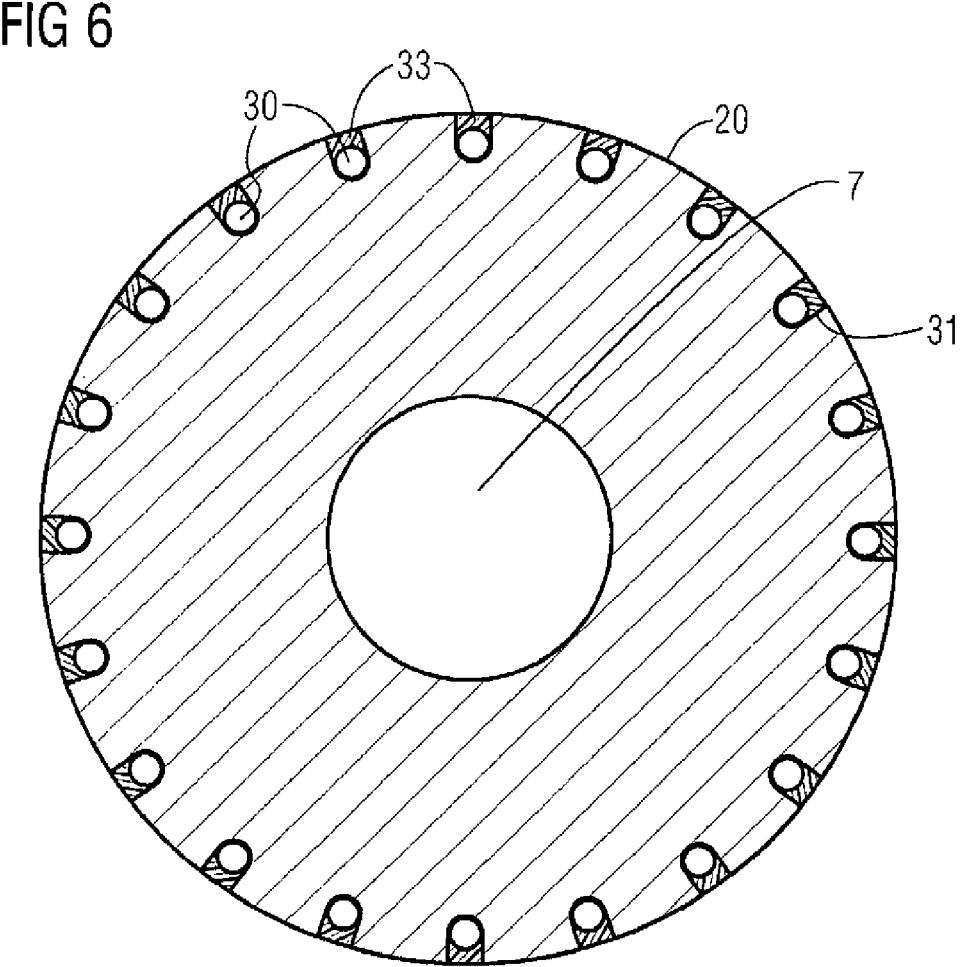
Figure 7:
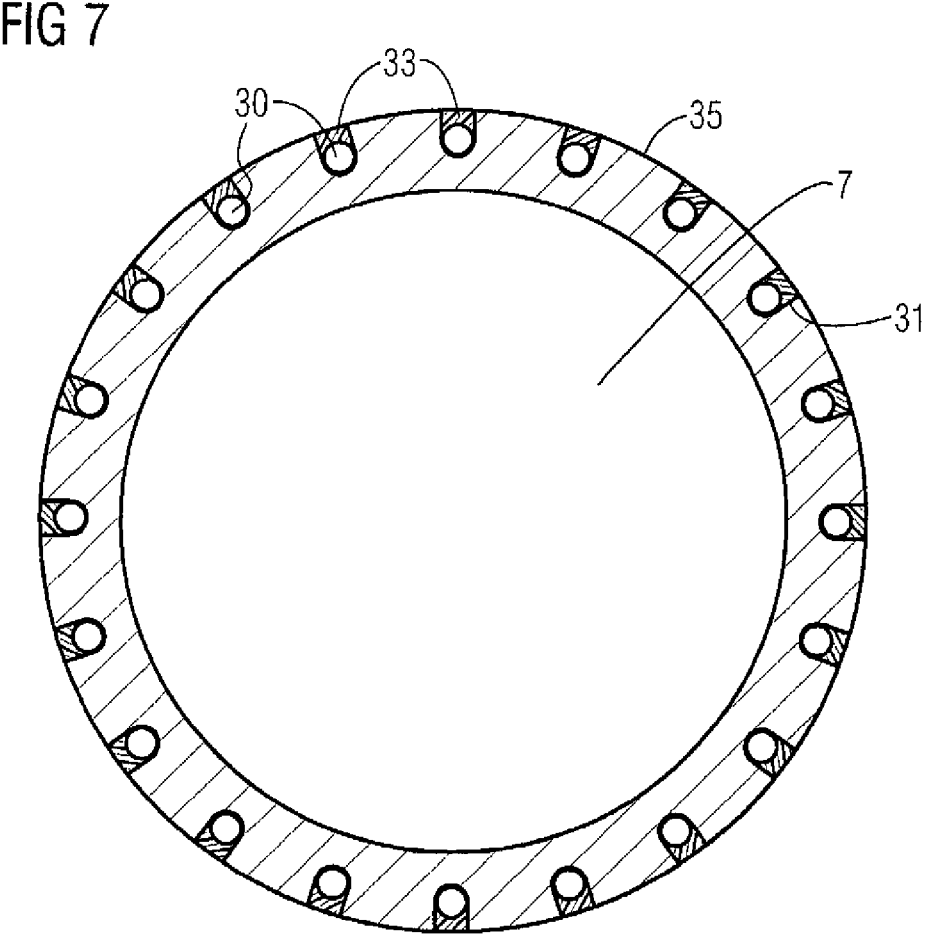
FIG. 7 shows a sleeve.

FIGS. 5 and 6 show an additional possible way of improving the thermal conductivity of the output drive shaft 7 in a cross section through the output drive shaft 7 of the embodiment according to FIG. 2.

In this case, heat pipes 30 which are thermally coupled to the output drive shaft 7 and/or the inner cylinder 20 and/or the cavity 14 by means of thermally conductive materials are situated in axially running recesses 31 and/or holes 32 in the inner cylinder 20.

These heat pipes 30 may also be situated in an additional sleeve 35 which is arranged between the output drive shaft 7 and the cavity 14. In this case, there is advantageously no need to change the design of the output drive shaft 7. The condenser zones of the heat pipes 30 are likewise outside the motor space in this embodiment.

The recesses of the sleeve 35 itself are involved in transporting away heat even if no heat pipes 30 are used, for example by means of a cooling medium which is present in them or passes through them, be it water or air. An air flow is generated by separate ventilation or self-ventilation, while the flow of water is achieved by pumping or by the movement of a ship in the water, for example.

Such a design of a drive using an electric motor with permanent magnet excitation is suitable for electrical locomotive vehicles, ship propulsion systems, in particular propulsion pods, since the medium surrounding the electric motor constitutes an ideal heat sink on account of the movement of the locomotive vehicle or the ship. In the case of locomotive vehicles, the mechanical thermally highly conductive connection between the output drive shaft 7 and driven wheels forms an optimal heat sink.

In the case of ship propulsion systems, the rudder blades form an enlarged cooling area. In the case of propulsion pods, in particular, the propeller shaft extends through the hollow shaft of the electric motor which is in the form of a synchronous machine 1 with permanent magnet excitation. Cooling can be additionally induced in propulsion pods using the sleeve 35. As a result of the movement of the ship, the water surrounding the pod flows through the recesses or holes 32 of the sleeve 35. No heat accumulation can therefore occur in the region of the heat sink.

The drive arrangement thus creates heat loss which is in the rotor 8 and is passed, via the cavity 14 of the hollow shaft 13, to the output drive shaft 7 which discharges the heat to cooling areas using essentially axial heat transport. In this case, drive tasks and heat transport are undertaken by the output drive shaft 7.

What is claimed is:

1. An electric motor with permanent magnet excitation, comprising:
    a solid output drive shaft of a propulsion vehicle, said output drive shaft having opposite ends;
    a stator;
    a rotor having a hollow shaft which is closed off in a pressure-tight manner with respect to the output drive shaft at least on its end faces to define an enclosed cavity containing a cooling medium which in an operating state evaporates on the hollow shaft in a region of permanent magnets when the hollow shaft is hot and condenses in a region of the output drive shaft which is colder than the hollow shaft to thereby establish a radial and axial heat transport;
    permanent magnets positioned on the rotor; and
    driven wheels shrunk onto the ends of the output drive shaft and providing a cooling surface for condensation of the cooling medium.

2. The electric motor of claim 1, wherein the stator is water-cooled.

3. The electric motor of claim 2, wherein the stator has a water cooling jacket.

4. The electric motor of claim 2, wherein the stator includes a laminated core and has cooling channels in and/or on the laminated core.

5. The electric motor of claim 1, wherein the cooling medium is ethyl alcohol.

6. The electric motor of claim 1, further comprising a sleeve arranged between the output drive shaft and the cavity.

7. The electric motor of claim 6, wherein at least one of the output drive shaft, the hollow shaft, and the sleeve accommodates axial heat pipes.

8. The electric motor of claim 1, wherein the propulsion vehicle is a locomotive vehicle, said output drive shaft being configured in the form of a wheelset shaft of the locomotive vehicle.

9. The electric motor of claim 1, wherein the propulsion vehicle is a ship propulsion system, said output drive shaft representing a drive shaft of the ship propulsion system.

* * * * *